G. HAVENSTEIN.
AUXILIARY CAR FOR MOTOR CYCLES.
APPLICATION FILED NOV. 24, 1914.
1,145,682.
Patented July 6, 1915.
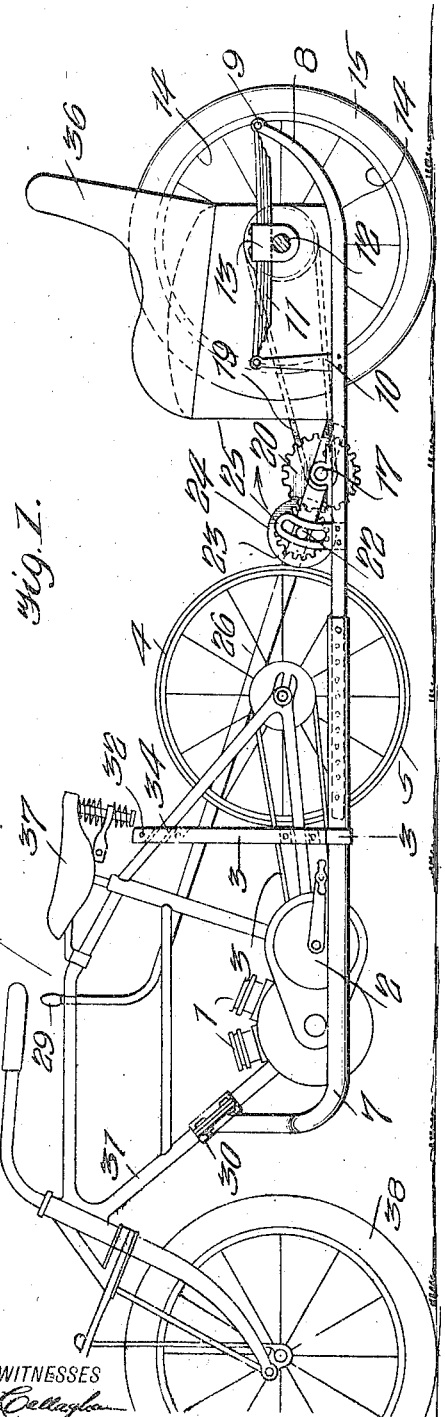
WITNESSES
E. H. Bellingham
H. E. Beck
INVENTOR
George Havenstein
BY Munn & Co.
ATTORNEYS

UNITED STATES PATENT OFFICE.

GEORGE HAVENSTEIN, OF SAN FRANCISCO, CALIFORNIA.

AUXILIARY CAR FOR MOTOR-CYCLES.

1,145,682.

Specification of Letters Patent.

Patented July 6, 1915.

Application filed November 24, 1914. Serial No. 873,728.

*To all whom it may concern:*

Be it known that I, GEORGE HAVENSTEIN, a citizen of the United States, and a resident of San Francisco, in the county of San Francisco and State of California, have invented a new and useful Improvement in Auxiliary Cars for Motor-Cycles, of which the following is a specification.

My invention is an improvement in auxiliary cars for motorcycles, and has for its object to provide a device of the character specified, which may be attached to a motorcycle of any approved construction, and wherein an adjustable frame is provided supported at one end by a pair of wheels and having means at the other end for permitting the said end to be connected to the frame of the motorcycle in such manner as to support the rear wheel thereof out of contact with the ground, and having driving mechanism arranged to connect the rear wheel of the motorcycle with the supporting wheels for the auxiliary car, and wherein the connection between the rear wheel and the supporting wheels is under the control of the rider of the motorcycle.

In the drawings:—Figure 1 is a side view of the improved transmission in place, Fig. 2 is a top plan view, and Fig. 3 is a section on the line 3—3 of Fig. 1.

The present embodiment of the invention is shown in connection with the frame of a motorcycle of any approved construction, the motorcycle being driven by the usual motor 1, supported in the frame, and having a transmission 2 connected by means of a belt 3 with the rear wheel 14. The usual pneumatic tire of the rear wheel is removed and is replaced by a tire 5 of fiber or other hard material of sufficient thickness to extend beyond the rim.

The frame of the attachment is a fork comprising a body 6 and sectional arms 7—7ª, extending alongside each other but diverging slightly from each other, and at the rear ends the said arms are bent upwardly as shown at 8, and they are connected by a cross rod 9 at this point.

An upstanding bracket 10 is connected with the rear section of each arm intermediate the ends thereof, and a laminated spring 11 is arranged between the rear end of each arm and the bracket. An axle 12 is arranged transversely of the rear sections of the arms above the same, and the axle is connected with each of the springs 11 at approximately the center thereof as indicated at 13.

Wheels 14 are journaled on the ends of the axle, each wheel in the present instance having a pneumatic tire 15, and a sprocket wheel 16 is secured to the inner face of each wheel coaxial therewith. A shaft 17 is journaled transversely of the frame in front of the wheels, and each end of the shaft is provided with a sprocket wheel 18. Each sprocket wheel 18 is connected to the adjacent wheel 16 by means of a sprocket chain 19, and between the arms of the frame the shaft 17 is provided with a gear wheel 20. This wheel 20 meshes with a pinion 21, journaled loosely on a shaft 22, connected with the arms of the frame in a manner to be presently described, and a friction disk 23 also journaled loosely on the shaft and rigid with the pinion 21 engages the fiber tire of the rear wheel 4 of the motorcycle.

A bracket 24 is secured to the rear section 7ª of each arm 7—7ª at the shaft 22, and each arm is provided with an arc-shaped guideway 25, the said guideway being concentric with the shaft 17. The shaft 22 is movable in the guideways of the bracket arms 24, but whatever its position in the guideways it is at the same distance with respect to the shaft 17. Thus when the frame is connected with the motorcycle in a manner to be presently described, and the motor cycle rear wheel is running it will rotate the disk 23, and because of the engagement of the wheels 20 and 21 the shaft 17 will be rotated and this shaft will drive the wheels 15 of the frame.

The shaft 22 being movable in the guides may be moved in such manner as to cause the disk 23 to engage with or to disengage from the rear wheel, to connect the wheels of the frame with the rear wheel or to disconnect the said wheels therefrom. The shaft 22 is moved by means of a lever 26, having an extension 27 at the end adjacent to the shaft 17, and parallel with the body of the lever and connected thereto by a cross connection 28.

The lever and the extension are journaled on the shaft 17, and both shaft and extension are connected with the shaft 22 in such manner that when the lever is moved by means of the handle 29 at the forward end thereof, the shaft 22 will be moved. By means of the lever the friction disk 23 may be moved into or out of engagement with the rear wheel to cause the rear wheel to drive the wheels 14 of the auxiliary car. The body 6 of the frame is bent upward as shown more particularly in Fig. 1, and is provided with a sleeve 30 fitting over the front lower member 31 of the frame of the motorcycle.

The front section of each of the arms is provided near its inner end with an upright or bracket 32, each of the said uprights or brackets inclining inwardly toward its upper end, and each bracket is provided with bearings 33 and 34 respectively, for engaging the lower and upper members of the adjacent rear fork of the motor-cycle. The sections of each arm are telescoping, the rear section 7ª sliding in the front section 7, and a bolt and nut 35 is provided for securing the sections in adjusted position, the bolt passing through a diametrical opening in the rear section and one of a series of openings in the front section, and being engaged by the nut to hold the parts in adjusted position.

By removing the bolt the sections may be adjusted to move the seat 36 of the auxiliary car toward or from the motorcycle, the said seat being supported by the rear sections of the arms of the frame.

It will be understood that the rear wheel 4 of the motor-cycle is supported out of contact with the surface upon which the front wheel 38 of the motor-cycle and the wheels 14 of the auxiliary car rest. The operator seated on the saddle 37 of the motorcycle first starts his motor 1 with the disk 23 out of contact with the rear wheel. When the motor has picked up a sufficient speed the disk 23 is moved into contact with the tire of the rear wheel, and it will be evident that the motor-cycle and the auxiliary car will begin to move, the rear wheels 14 being driven by the chains 19.

The connection between the driving wheels of the combined motorcycle and car is at all times under the control of the rider of the motorcycle and he can instantaneously disconnect the driving wheels from the motor. With the connection between the motor and the driving wheels 14 in place, the driver may brake the movement of the combined cycle and car with the brake acting on the rear wheel 4 of the motorcycle.

The auxiliary frame 6—7—7ª is preferably of pressed steel or tubing of suitable cross section, and any desired construction or arrangement of seat 36 may be mounted on the auxiliary frame. The rear end of the auxiliary frame is spring supported, the laminated or leaf spring 11 cushioning any shock or jar.

I claim:—

1. In combination with the motorcycle, a substantially U-shaped auxiliary frame for connection therewith, said frame comprising a body and sectional arms, the body being bent upward and having a sleeve for engaging the front lower member of the motorcycle frame, the sections of the arms being adjustable and the rear section of each arm being bent upward at its outer end, each rear section of the arm having an upstanding bracket intermediate its ends, a leaf spring connecting the rear end of each arm and the adjacent bracket, a rear axle supported by the springs, wheels on the axle, each wheel having a sprocket wheel rigid therewith on the inner face thereof, a driving shaft journaled on the auxiliary frame in front of the rear axle, and provided at each end with a sprocket wheel, a chain connecting each wheel with the adjacent wheel of the axle, guide brackets on the rear sections of the arms in front of the driving shafts, each bracket having a guide concentric with the driving shaft, a connecting shaft having its ends received in the guides, a gear connection between the driving shaft and the connecting shaft, a friction disk on the connecting shaft and adapted to engage the periphery of the rear wheel of the motor cycle, a lever journaled on the driving shaft and extending forwardly to near the seat of the motorcycle, and a connection between the front section of each arm and the frame of the motorcycle.

2. In combination with a motorcycle, a substantially U-shaped auxiliary frame for connection therewith, said frame comprising a body and sectional arms, the body and the arms adjacent thereto being bent upward and having a sleeve for engaging the front lower member of the motorcycle frame, the sections of the arms being adjustable and the rear section of each arm being bent upward at its outer end, each rear section having an upstanding bracket intermediate its ends, a spring connecting the rear end of each arm and the adjacent bracket, a rear axle supported by the springs, wheels on the axle, a bracket on the front section of each arm for engaging the motorcycle frame at the adjacent side, said frame being adapted to support the motorcycle with the rear wheel out of contact with the ground, driving mechanism connected with the wheels on the axle for driving the same, and means extending to near the seat of the motorcycle for moving the driving mechanism into and out of engagement with the rear wheel.

3. In combination with a motorcycle, an auxiliary frame having coaxial wheels at one end thereof, and provided at the opposite end and intermediate its ends with means for engaging the motorcycle frame to support the rear wheel thereof out of contact with the ground, a driving shaft journaled transversely of the auxiliary frame and having a driving connection at each end with the adjacent wheel, a connecting shaft, brackets on the arms of the frame, said brackets having guides concentric with the driving shaft for receiving the ends of the connecting shaft, a friction disk journaled loosely on the connecting shaft, a gear connection between the disk and the driving shaft, and means for moving the connecting shaft to bring the disk into and out of contact with the rear wheel of the motor cycle, said means comprising a lever having an extension parallel therewith and rigidly connected thereto, the lever and the extension being journaled on the driving shaft, and having bearings for supporting the connecting shaft.

4. In combination with a motorcycle, an auxiliary frame having coaxial wheels at one end thereof, and provided at the opposite end and intermediate its ends with means for engaging the motorcycle frame to support the rear wheel thereof out of contact with the ground, a driving shaft journaled transversely of the auxiliary frame and having a driving connection at each end with the adjacent wheel, a connecting shaft, brackets on the arms of the frame, said brackets having guides concentric with the driving shaft for receiving the ends of the connecting shaft, a friction disk journaled loosely on the connecting shaft, a gear connection between the disk and the driving shaft, and means for moving the connecting shaft to bring the disk into and out of contact with the rear wheel of the motorcycle, said means comprising a lever journaled on the driving shaft and having bearings for supporting the connecting shaft.

5. In combination with a motorcycle, an auxiliary frame having coaxial wheels at one end thereof, and provided at the opposite end and intermediate its ends with means for engaging the motor cycle frame to support the rear wheel thereof out of contact with the ground, a driving shaft journaled transversely of the auxiliary frame and having a driving connection at each end with the adjacent wheel, a connecting shaft, brackets on the arms of the frame, said brackets having guides concentric with the driving shaft for receiving the ends of the connecting shaft, a friction disk journaled loosely on the connecting shaft, a gear connection between the disk and the driving shaft, and means for moving the connecting shaft to bring the disk into and out of contact with the rear wheel of the motorcycle.

GEORGE HAVENSTEIN.

Witnesses:
B. F. HAND,
J. W. FOST.